United States Patent [19]

Yoo

[11] Patent Number: 5,724,473
[45] Date of Patent: Mar. 3, 1998

[54] AUTOMATIC GUIDE-CHANNEL MAPPING METHOD OF A VCR

[75] Inventor: Kyoung Kou Yoo, Kyungki-do, Rep. of Korea

[73] Assignee: LG Electronics Inc., Seoul, Rep. of Korea

[21] Appl. No.: 502,893

[22] Filed: Jul. 17, 1995

[30] Foreign Application Priority Data

Jul. 19, 1994 [KR] Rep. of Korea ............... 17370/1994

[51] Int. Cl.⁶ .................................. H04N 5/91; G11B 5/00
[52] U.S. Cl. .................................. 386/83; 360/32
[58] Field of Search .................... 358/335, 342, 358/310, 311; 360/32, 33.1, 13; 348/563, 570, 731, 734, 732; 455/151, 181.1, 182, 186.1; 386/83, 46, 109, 1, 27, 33, 35; H04N 5/91; G11B 5/00

[56] References Cited

FOREIGN PATENT DOCUMENTS

| | | |
|---|---|---|
| 5307173 | 4/1994 | Canada . |
| 5335079 | 8/1994 | Canada . |
| 0577283 | 1/1994 | European Pat. Off. . |

OTHER PUBLICATIONS

Gemstar, VCR Plus, 1990, pp. 1–6.

*Primary Examiner*—Robert Chevalier
*Attorney, Agent, or Firm*—Fish & Richardson P.C.

[57] ABSTRACT

An automatic guide-channel mapping method of a VCR for allowing a local broadcasting channel number and a guide channel included in a compressed code to be automatically mapped only by a user's designation of the input of the compressed code and the local broadcasting channel number reserved to be recorded is performed by a compressed code decoding step of decoding the compressed code if the input of said compressed code is completed during a compressed code reserved recording, a mapping determination step of determining whether a guide channel among the decoded compressed code is mapped with a specific local broadcasting channel number or not, and a mapping processing step of supplying a local broadcasting channel number to be subjected to a mapping process when the guide channel is not mapped with the local broadcasting channel number, thereby enabling the guide channel mapping of the compressed code only by an operation once.

1 Claim, 4 Drawing Sheets

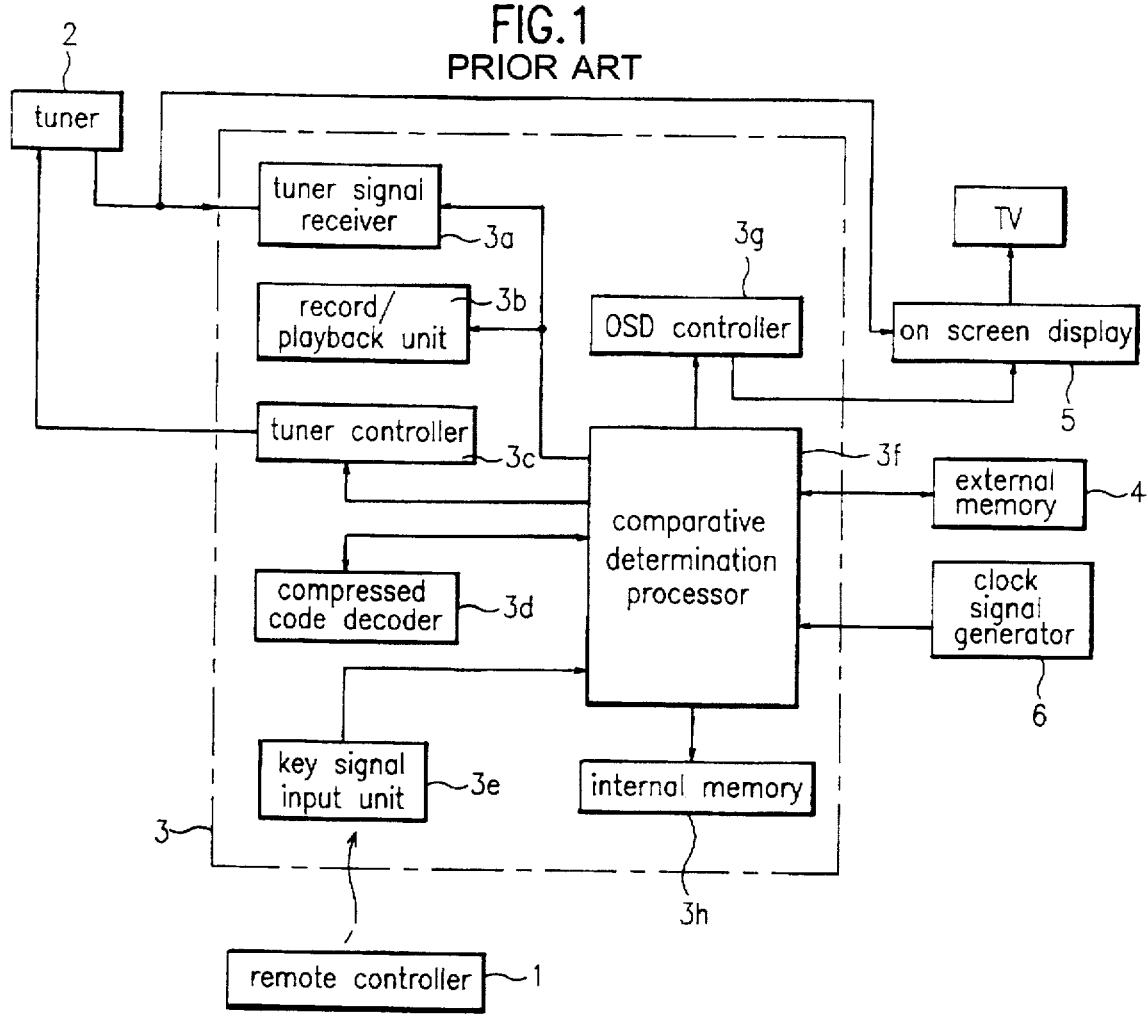

FIG.4A

```
compressed code : 1 2 3 4 5 6
   PR           : ⊖ —
   DATE         : 11/05
   TIME         : 11:00 — 12:00
```

FIG.4B

```
compressed code : 2 4 5 3 1
   PR           : ∅1 ARD
   DATE         : 12/05
   TIME         : 11:30 — 11:45
```

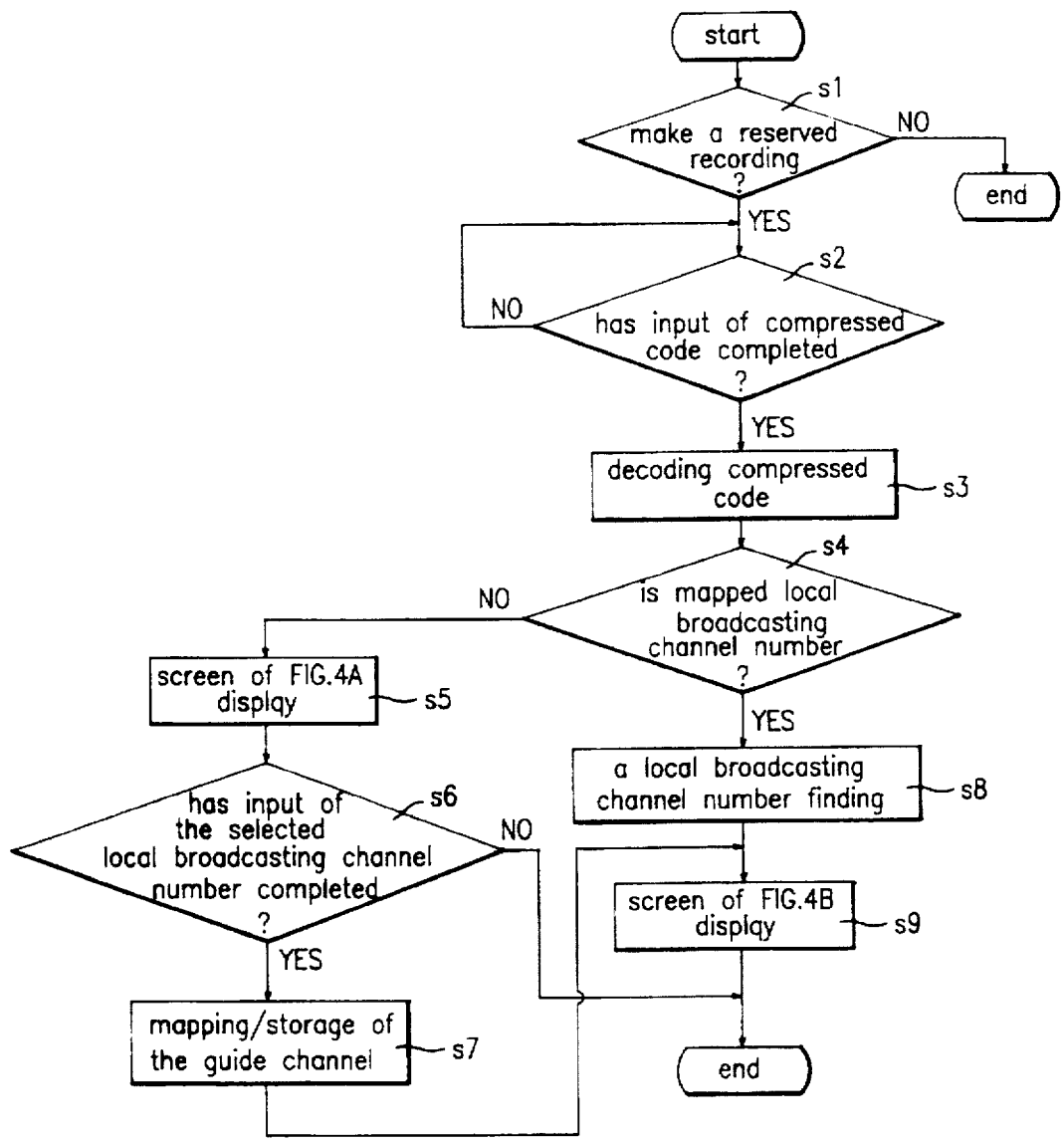

AUTOMATIC GUIDE-CHANNEL MAPPING METHOD OF A VCR

BACKGROUND OF THE INVENTION

1. Field of the Invention

The present invention relates to an automatic guide-channel mapping method of a VCR, and more particularly to an automatic guide-channel mapping method of a VCR, wherein a local broadcasting channel number and a guide channel included in a compressed code are automatically mapped when a user simply designates the input of the compressed code and the local broadcasting channel number reserved to be recorded.

2. Description of the Prior Art

A compressed code generally includes information such as a channel, a reserved date of recording, starting & ending time of a local broadcasting channel reserved to be recorded, which is a G-code utilized during a reserved recording by an abbreviated button.

FIG. 1 is a block diagram showing a construction of a guide-channel mapping apparatus of a general VCR.

As shown in FIG. 1, the guide-channel mapping apparatus of the general VCR includes a remote controller 1, a tuner 2, a microcomputer 3, an external memory 4 consisting of an E$_2$PROM, an on-screen display (OSD) 5, and a clock signal generator 6.

Here, microcomputer 3 is formed of a tuner signal receiver 3a, a record/playback unit 3b, a tuner controller 3c, a compressed code decoder 3d, a key signal input unit 3e, a comparative determination processor 3f, an OSD controller 3g and an internal memory 3h.

An operation of the guide-channel mapping apparatus of the general VCR constructed as above will be described with reference to FIG. 2.

FIG. 2 shows the screen of the OSD during a general guide channel mapping.

Once a user supplies a guide-channel mapping mode by using remote controller 1 in case of a reserved recording, the present channel and a guide channel Guide CH are displayed on OSD 5, as shown in FIG. 2.

Then, in case it is intended to make a reserved recording by means of the compressed code in the guide-channel mapping mode, the present channel number under reception is designated, and the guide channel of a broadcasting station listed on a newspaper or magazine is provided.

The mapping is completed by repeating the above-stated operation with respect to every broadcasting received, and comparative determination processor 3f within microcomputer 3 permanently stores the guide channel information on external memory 4.

Upon the completion of the above-described operation, the user supplies the compressed code by means of remote controller 1.

When the compressed code is received, key signal input unit 3e receives the compressed code to supply it to comparative determination processor 3f. After the input of the compressed code is completed, comparative determination processor 3f controls compressed code decoder 3d for storing channel information, reserved date of recording, starting & ending time of the local broadcasting channel reserved to be recorded, which are compressed into the compressed code, on internal memory 3h.

Meanwhile, since the channel information obtained by decoding the compressed code is just guide channel, but actually broadcasted channel is different depending on regions, an actual local broadcasting channel number corresponding to the guide channel obtained by decoding the compressed code stored on internal memory 3h is required in an actual reserved recording.

More specifically, among local broadcasting channel numbers stored on external memory 4 after being mapped in the guide-channel mapping mode, comparative determination processor 3f stores the corresponding broadcasting channel number on internal memory 3h by means of the guide channel obtained by decoding the compressed code.

After completing this operation, comparative determination processor 3f receives a clock signal from clock signal generator 6 to control tuner controller 3c when a current time concurs with the reserved recording time during the lapse of time, so that tuner 2 is selected by the local broadcasting channel number stored on internal memory 3h.

When the channel selection is completed, record/playback unit 3b is controlled to be a record mode to record the tuner selection channel received from tuner signal receiver 3a.

However, in the above-described conventional technique, an exclusive mapping mode is added onto the OSD or an exclusive mapping button is separately added to a remote controller during mapping the local broadcasting channel and guide channel. Therefore, the effectiveness of the simple reservation which is the most available advantage of a compressed code reservation recording system is impaired, and the manipulating number of a button is increased while raising material cost and increasing the kind of keys.

Furthermore, since the guide channels of local broadcasting channels to make a reserved recording are confirmed on a medium such as a newspaper and magazine one by one to memorize the guide channels, the compressed code function itself is complicated and difficult to be utilized.

SUMMARY OF THE INVENTION

It is an object of the present invention to provide an automatic guide-channel mapping method of a VCR for enabling guide channel mapping of a compressed code only by an operation once without requiring a separate guide-channel mapping apparatus.

To achieve the above object of the present invention, there is provided an automatic guide-channel mapping method of a VCR. Here, a compressed code decoding step decodes a compressed code if the input of the compressed code is completed during a compressed code reserved recording, and a mapping determination step is then performed by determining whether a guide channel among the decoded compressed code is mapped with a specific local broadcasting channel number or not. Thereafter, a mapping processing step is executed by supplying a local broadcasting channel number to be subjected to a mapping process when the guide channel is not mapped with the specific local broadcasting channel number.

BRIEF DESCRIPTION OF THE DRAWINGS

The above objects and other advantages of the present invention will become more apparent by describing in detail preferred embodiments thereof with reference to the attached drawings in which:

FIG. 1 is a block diagram showing a construction of a guide-channel mapping apparatus of a general VCR;

FIG. 2 shows the screen status of the OSD in FIG. 1 during the guide channel mapping;

FIGS. 4A and 4B show the screen status of the OSD during the guide channel mapping according to the automatic guide-channel mapping method of the VCR of the present invention; and FIG. 5 shows an operational flowchart of the automatic guide-channel mapping method of the VCR according to the present invention.

DETAILED DESCRIPTION OF THE PREFERRED EMBODIMENT

Figure 3:
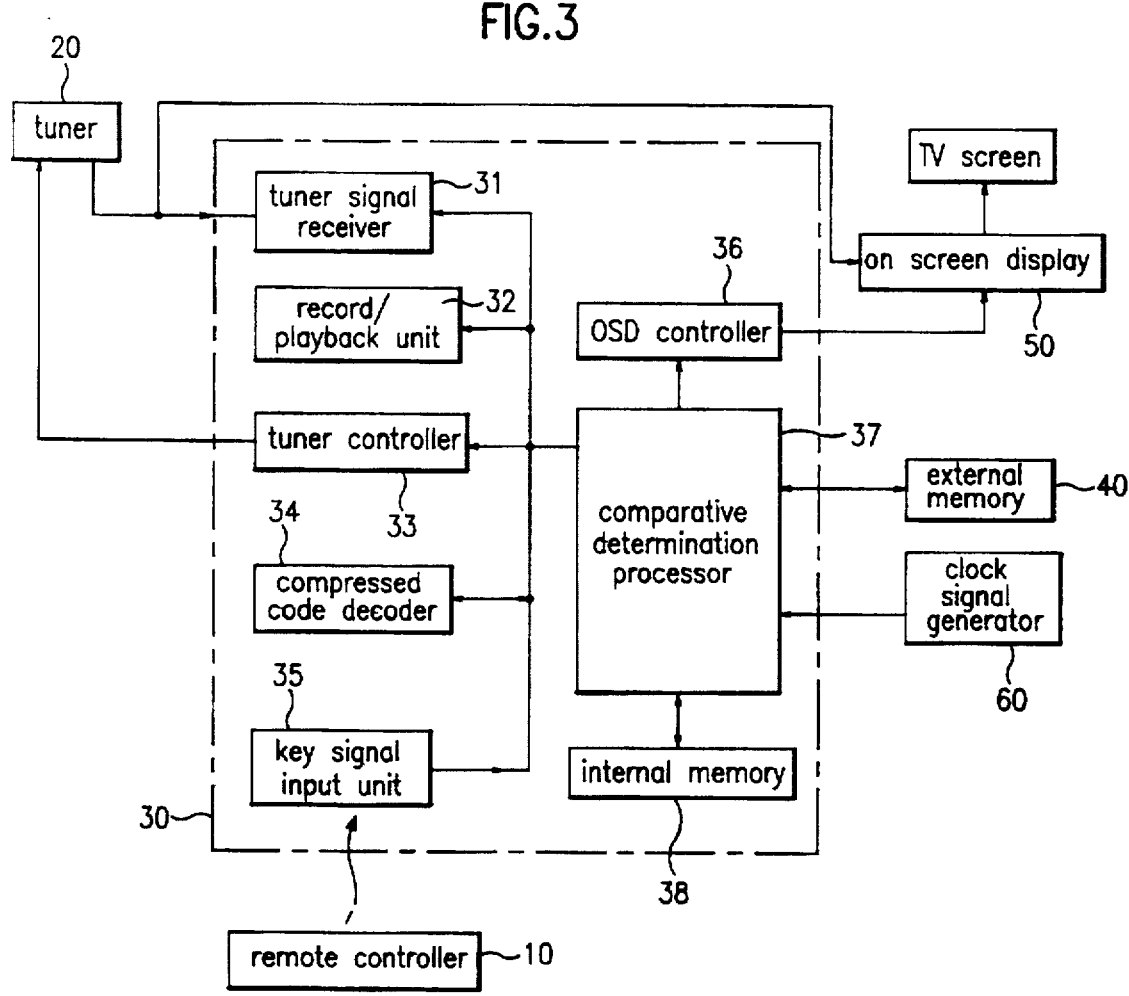
FIG. 3 is a block diagram showing a hardware to which the automatic guide-channel mapping method of a VCR according to the present invention is applied.

FIG. 3 shows a construction of a hardware for applying an automatic guide-channel mapping method of a VCR according to the present invention, in which the construction is the same as that shown in FIG. 1, but the signal flow is different therefrom.

As shown in FIG. 3, a guide-channel mapping apparatus of the VCR for applying the present invention includes a remote controller 10, a tuner 20, a microcomputer 30, an external memory 40, an OSD 50 and a clock signal generator 60.

Here, microcomputer 30 is formed of a tuner signal receiver 31, a record/playback unit 32, a tuner controller 33, a compressed code decoder 34, a key signal input unit 35, an OSD controller 36, a comparative determination processor 37 and an internal memory 38.

An operation of the guide-channel mapping apparatus of the VCR formed as above will be described with reference to FIGS. 4A and 4B.

FIG. 4A shows a screen status of the OSD when a guide channel is not mapped with a local broadcasting channel number, and FIG. 4B shows a screen status of the OSD when the guide channel is mapped with the local broadcasting channel number.

First, when a compressed code key signal is supplied from remote controller 10, comparative determination processor 37 controls OSD controller 36 to display a message of providing the compressed code on a television screen via OSD 50.

Thus, if a user provides the compressed code with reference to the OSD message on the television screen, key data of key signal input unit 35 is transmitted to compressed code decoder 34.

Compressed code decoder 34 decodes the transmitted compressed code into information of guide channel, reserved date of recording DATE, starting & ending time of the local broadcasting channel reserved to be recorded, and supplies the information to comparative determination processor 37.

Upon the completion of the decoding in compressed code decoder 34, comparative determination processor 37 controls OSD controller 36 to permit the user to confirm the accurate input of the compressed code, so that FIG. 4A or 4B is displayed on the television screen via OSD 50.

At this time, the screen shown in FIG. 4A is displayed when the user attempts the reserved recording by means of the compressed code for the first time with a specific local broadcasting channel number, in which a cursor blanks on local broadcasting channel number PR to enable the user to designate the local broadcasting channel number.

When the user designates local broadcasting channel number PR to 01 by means of remote controller 10, comparative determination processor 37 maps the guide channel obtained by decoding the compressed code and the local broadcasting channel number designated by the user to permanently store the result on external memory 40.

Meanwhile, if the above-described process is already performed with respect to a broadcasting station of which local broadcasting channel is intended to be recorded by reservation by means of the compressed code, comparative determination processor 37 controls OSD controller 36 to display the screen of the OSD shown in FIG. 4B, thereby completing the reserved recording.

FIG. 5 shows an operational flowchart of the automatic guide-channel mapping method of the VCR according to the present invention.

Referring to FIG. 5, the automatic guide-channel mapping method of the VCR according to the present invention will be described.

To begin with, upon the completion of the input of the compressed code during the compressed code reserved recording, compressed code decoding steps S1, S2 and S3 for decoding the compressed code are carried out.

That is, in case of the compressed code reserved recording in step S1, it is examined whether the compressed code input is completed or not in step S2. If it is determined that the compressed code input is completed in step S2, the input compressed code is decoded in step S3; otherwise, step S2 of examining the completion of the compressed code input is repeatedly executed.

After performing the compressed code decoding steps are performing, a mapping determination step S4 is carried out for determining whether the guide channel in the decoded compressed code is mapped with a specific local broadcasting channel number, i.e., a selected station channel.

Then, a local broadcasting channel number is supplied to perform mapping processing steps S5, S6 and S7 for executing the mapping with the guide channel when the guide channel is not mapped with the specific local broadcasting channel number after performing the mapping determination step S4.

The mapping processing steps consist of a display step S5, a local broadcasting channel number input step S6 and a mapping & storing step S7.

Display step S5 is performed by displaying the decoded information of the compressed code on the screen of the OSD as shown in FIG. 4A if the guide channel is not mapped with the specific local broadcasting channel number after performing the mapping determination step S4.

In other words, as shown in FIG. 4A, the local broadcasting channel number is displayed on the Screen of the OSD as blinking data, and the reserved date of recording and the starting & ending time of the reserved local broadcasting channel are displayed as the decoded information of the compressed code.

The local broadcasting channel number input step S6 is performed by supplying the local broadcasting channel number displayed as the blinking data by means of the cursor when the local broadcasting channel number is displayed on the screen of the OSD as shown in FIG. 4A.

If the input of the local broadcasting channel number is not completed in the local broadcasting channel number input step S6, this procedure is finished.

In the mapping & storing step S7, the received local broadcasting channel number and guide channel are mapped to be stored in a non-volatile memory upon the completion of the local broadcasting channel number, the result is displayed in step S9 as shown in FIG. 4B to terminate the reserved recording.

In more detail, as shown in FIG. 4B, after executing the mapping & storing step S7, the decoded information of the compressed code and a fixed local broadcasting channel number are displayed on the screen of the OSD, in which the fixed local broadcasting channel number, reserved date of recording, and starting & ending time of the local broadcasting channel reserved to be recorded are displayed on the screen of the OSD as the decoded information of the compressed code in step S9.

Also, when the guide channel is mapped with the specific local broadcasting channel number confirmed by performing the mapping determining step S4, local broadcasting channel number finding steps S8 and S9 of instantly settling the local broadcasting channel number without mapping the guide channel and local broadcasting channel number are carried out.

That is, when it is determined that the mapping is carried out in step S4, the local broadcasting channel number finding step S8 of instantly settling the local broadcasting channel number is performed, and the display step S9 of displaying the decoded information of the compressed code and fixed local broadcasting channel number on the screen of the OSD as shown in FIG. 4B, thereby completing the reserved recording.

In connection with the finding step S8, since the mapping of the specific local broadcasting channel number and guide channel is stored in the non-volatile memory, the local broadcasting channel number is instantly found without repeatedly mapping the local broadcasting channel number and guide channel since the result of mapping can be used, thereafter.

Here, the display step S9 is carried out by displaying the fixed local broadcasting channel number, reserved date of recording, starting & ending time of the local broadcasting channel reserved to be recorded as the decoded information of the compressed code on the screen of the OSD, as shown in FIG. 4B.

In the automatic guide-channel mapping method according to the present invention as described above, when a user supplies a compressed code and designates a local broadcasting channel number to be recorded by reservation, the local broadcasting channel number and guide channel included in the compressed code are automatically mapped to be permanently stored on a memory. Therefore, the inconvenience that the user separately memorizes the guide channels one by one is eliminated, and an additional button for mapping the local broadcasting channel number and guide channel during the reserved recording is not required.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An automatic guide-channel mapping method of a VCR, comprising the steps of:

decoding compressed code;

determining whether a guide channel and a specific local broadcasting channel number have been mapped by the decoded compressed code;

displaying a blank field corresponding to said specific local broadcasting channel number wherein said step of displaying comprises displaying a reserved date of recording, a starting time, and an ending time of a local broadcasting channel reserved to be recorded as said decoded information of said compressed code on said screen of said display on a screen of a display when the guide channel and the specific local broadcasting channel have not been mapped;

inputting the specific local broadcasting channel number in the displayed blank field; and storing the specific local broadcasting channel number and the guide channel after mapping.

* * * * *